(12) United States Patent
Osawa et al.

(10) Patent No.: US 8,931,982 B2
(45) Date of Patent: Jan. 13, 2015

(54) THROW-AWAY ROTATING TOOL

(75) Inventors: Jiro Osawa, Toyokawa (JP); Takuma Aoyama, Toyokawa (JP); Tasuku Itoh, Toyokawa (JP); Ikuo Takikawa, Toyokawa (JP)

(73) Assignee: OSG Corporation, Aichi (JP)

( * ) Notice: Subject to any disclaimer, the term of this patent is extended or adjusted under 35 U.S.C. 154(b) by 974 days.

(21) Appl. No.: 12/736,791

(22) PCT Filed: Dec. 8, 2009

(86) PCT No.: PCT/JP2009/070568
§ 371 (c)(1),
(2), (4) Date: Nov. 8, 2010

(87) PCT Pub. No.: WO2011/070653
PCT Pub. Date: Jun. 16, 2011

(65) Prior Publication Data
US 2012/0099937 A1    Apr. 26, 2012

(51) Int. Cl.
*B23B 51/02* (2006.01)

(52) U.S. Cl.
CPC ............. *B23B 51/02* (2013.01); *B23B 2251/02* (2013.01)
USPC .......................................... 408/231; 408/226

(58) Field of Classification Search
USPC ................... 408/144, 226, 230, 231
See application file for complete search history.

(56) References Cited

U.S. PATENT DOCUMENTS

| | | | |
|---|---|---|---|
| 6,059,492 A * | 5/2000 | Hecht | 408/144 |
| 6,582,164 B1 | 6/2003 | McCormick | |
| RE40,297 E * | 5/2008 | Berglund et al. | 408/1 R |
| 7,625,161 B1 * | 12/2009 | Ruy Frota de Souza | 408/227 |
| 2002/0159851 A1 | 10/2002 | Krenzer | |
| 2005/0084352 A1 | 4/2005 | Borschert et al. | |
| 2006/0072976 A1 | 4/2006 | Frota de Souza | |
| 2006/0093449 A1 | 5/2006 | Hecht et al. | |
| 2009/0116920 A1 | 5/2009 | Bae | |

FOREIGN PATENT DOCUMENTS

| | | |
|---|---|---|
| JP | 2002-501441 | 1/2002 |
| JP | 2003-505261 | 2/2003 |
| JP | 2003-245813 | 9/2003 |
| JP | 2005-517539 | 6/2005 |
| JP | 2008-517787 | 5/2008 |
| WO | WO 98/53943 | 12/1998 |

(Continued)

OTHER PUBLICATIONS

English translation of International Search Report for PCT/JP2009/070568.

*Primary Examiner* — Daniel Howell
*Assistant Examiner* — Chwen-Wei Su
(74) *Attorney, Agent, or Firm* — Muramatsu & Associates

(57) ABSTRACT

A throw-away rotating tool includes plural protrusions formed in a part of an outer peripheral wall of a projecting coupling portion. Since the twist angle and a twist direction of the protrusions are set in such a way that with relative rotation when coupling the projecting coupling portion and erected portions together, due to the reaction force received by the protrusions from inner peripheral walls, the projecting coupling portion is pulled to the rear and side of the erected portions and the projecting coupling portion is stably held between the erected portions. Since the number of portions that require stringent dimension control and high machining accuracy can be reduced, productivity can be improved.

6 Claims, 5 Drawing Sheets

(56) References Cited

FOREIGN PATENT DOCUMENTS

| WO | WO 2008/072840 | 6/2008 |
| WO | WO 2009/037020 | 3/2009 |
| WO | WO 2011/065901 | 6/2011 |

* cited by examiner

THROW-AWAY ROTATING TOOL

TECHNICAL FIELD

The present invention relates to a throw-away rotating tool, and more particularly to a throw-away rotating tool which enables an improvement in productivity, and is excellent in ease of attachment and detachment of a cutting head to and from a body.

BACKGROUND ART

A throw-away rotating tool is a tool in which a cutting head having cutting edges is detachably held on a body. In the related art, a throw-away rotating tool is known in which a cutting head has a projecting portion (projecting coupling portion) whose diameter increases toward the rear end side, and a tool shank (body) has a recessed portion whose diameter decreases toward the distal end side see FIGS. 1, 8 and etc. in JP-T No. 2002-501441). The throw-away rotating tool disclosed in JP-T No. 2002-501441 is configured such that after the projecting coupling portion is inserted into the recessed portion in a state with the body and the cutting head shifted in phase around the axis, the cutting head is relatively rotated around the axis, thereby bringing the projecting coupling portion and the recessed portion into engagement with each other by making use of elastic deformation of the recessed portion of the body.

SUMMARY OF INVENTION

Technical Problem

In the technique disclosed in JP-T No. 2002-501441, misalignment of the cutting head with the axis is regulated by means of engagement between the projecting coupling portion and the recessed portion. Since the engagement between the projecting coupling portion and the recessed portion is accomplished by the projecting coupling portion coming into firm contact with the recessed portion, to bring the projecting coupling portion into firm contact with the recessed portion, the outside diameter and length of the projecting coupling portion, the inside diameter and depth of the recessed portion, the inclination angles of the outer peripheral surface of the projecting coupling portion and the inner peripheral surface of the recessed portion, and the like must be all strictly defined. For this reason, stringent dimension control and high machining accuracy are required when manufacturing a throw-away rotating tool, and thus there is a problem in that it is difficult to improve productivity.

In addition, since the entire outer peripheral surface of the projecting coupling portion is brought into firm contact with the recessed portion for fitting engagement, to attach and detach the projecting coupling portion to and from the recessed portion, it is necessary to rotate the cutting head relatively around the axis by applying a great force against the frictional force that develops between the recessed portion and the projecting coupling portion. Thus, there is a problem in that the throw-away rotating tool is insufficient in workability for attachment and detachment of the cutting head to and from the body.

The present invention has been made to address the above-described problems, and accordingly its object is to provide a throw-away rotating tool which enables an improvement in productivity, and is excellent in ease of attachment and detachment of a cutting head to and from a body.

Solution to Problem and Advantageous Effects of Invention

To attain the above object, in a throw-away rotating tool according to the first aspect of the invention, when attaching a cutting head to a body, a projecting coupling portion is inserted in a space formed by erected portions, and the body and the cutting head are relatively rotated around the axis to push protrusions in between inner peripheral walls. The erected portions into which the protrusions are pushed in tilt slightly to the outer peripheral side, and the protrusions sandwiched between the inner peripheral walls receive a reaction force in an oblique direction on the rear end side orthogonal to the protrusions. Due to the reaction force received by the protrusions from the inner peripheral walls, the projecting coupling portion is pulled to the rear end side of the erected portions. Thus, the projecting coupling portion is stably held between the erected portions, and its misalignment with the axis is restricted. As described above, since the projecting coupling portion is held between the erected portions through contact between the protrusions formed as a part of the outer peripheral wall of the projecting coupling portion, and the inner peripheral wall of the erected portions, when preparing the projecting coupling portion, dimension control for portions other than the protrusions can be less stringent. Also, it suffices that the dimension control for the inner peripheral walls of the erected portions and the protrusions be solely aimed at bringing the projecting coupling portion into alignment with the axis, and the dimension control for other portions can be mitigated. Since the number of portions that require stringent dimension control and high machining accuracy can be reduced in this away, there is an advantageous effect in that productivity for the throw-away rotating tool can be improved.

Also, since the protrusions are formed as a part of the outer peripheral wall of the projecting coupling portion, their contact areas with the inner peripheral walls of the erected portions can be made small as compared with the case in which the entire outer peripheral wall of the projecting coupling portion contacts the inner peripheral walls of the erected portions. As a result, the force required for the relative rotation for attaching and detaching the cutting head to and from the body can be reduced. Furthermore, when attaching the cutting head to the body by relatively rotating the cutting head and the body, the contact areas between the protrusions and the inner peripheral walls gradually increase, and so does the force with which the protrusions are pushed in between the inner peripheral walls. On the other hand, when detaching the cutting head from the body, the contact areas between the protrusions and the inner peripheral walls gradually decrease, and the force for pulling out the protrusions from the inner peripheral walls also gradually decreases. This provides an advantageous effect in that the cutting head can be gently detached from the body when replacing the cutting head, thereby improving the ease of detachment. Attaching the cutting head to the body can be also performed with a relatively light force, thereby improving the ease of attachment.

In a throw-away rotating tool according to the second aspect of the invention, a ridge line on the side facing the direction of relative rotation between a groove and the inner peripheral walls, which are formed as a set of arcuate curves of the same radius centered about the axis, forms a part of the groove and is created along the groove. Thus, its twist direction is the same as that of the groove, and its twist angle is the same as that of the groove. On the other hand, the twist direction of the plural protrusions is set to the same direction as the twist direction of the ridge line, and their twist angle is set to an angle larger than the twist angle of the ridge line. As a result, when the cutting head and the body are relatively rotated around the axis, the protrusions come into contact with the inner peripheral walls from the rear end side, and the contact areas between the protrusions and the inner peripheral walls gradually increase with the relative rotation, causing the protrusions to be sandwiched between the inner peripheral walls. Such inner peripheral walls can be manufactured by performing drilling in a cylindrical shape from the center of the distal end surface of the body along the axial direction so as to cut off a part of the groove. In addition, since the twist angle of the protrusions can be set with reference to the twist angle of the groove, in addition to the advantageous effect provided by the throw-away rotating tool according to the first aspect noted above, there is an advantageous effect in that the manufacture of the inner peripheral walls and the protrusions becomes easy and productivity can be improved.

In a throw-away rotating tool according to the third aspect of the invention, the throw-away rotating tool includes a first surface formed as a surface located on the distal end side of the erected portions in a direction orthogonal to the axial direction, and a first receiving portion formed as a surface projected to the outer peripheral side from the projecting coupling portion in a direction orthogonal to the axial direction, and the first receiving portion is formed at a position where the first receiving portion overlaps and presses on the first surface when the protrusions are sandwiched between the inner peripheral walls of the erected portions by relatively rotating the body and the cutting head about the axis. Thus, the cutting head is firmly held in place with respect to the axial direction of the body by means of the force with which the projecting coupling portion is pulled to the rear end side of the erected portions due to the reaction force received by the protrusions from the inner peripheral walls, and the force with which the first receiving portion presses on the first surface. With regard to the positional relationship in the axial direction between the first receiving portion and the first surface, it is sufficient that the relationship be so set as to allow the first receiving portion to press on the first surface. Thus, the machining tolerance for the first receiving portion and the first surface can be set loose. Thus, in addition to the advantageous effect provided by the throw-away rotating tool according to the first or second aspect noted above, movement of the cutting head with respect to the axial direction can be regulated with a relatively loose machining tolerance, thereby enabling to improve the productivity of the throw-away rotating tool.

In a throw-away rotating tool according to the fourth aspect of the invention, the throw-away rotating tool includes a second receiving portion formed in the outer periphery on the distal end side of the cutting head, and a second surface that is connected to the distal end side of the inner peripheral walls and inclined toward the axis, and the second surface is formed at a position that overlaps the second receiving portion when the protrusions are sandwiched between the inner peripheral walls of the erected portions by relatively rotating the body and the cutting head about the axis. Thus, even when the protrusions sandwiched between the inner peripheral walls of the erected portions move in the axial direction, the second receiving portion of the cutting head abuts on the second surface of each of the erected portions, thereby restricting further movement in the axial direction. As a result, in addition to the advantageous effect provided by the throw-away rotating tool according to any one of the first to third aspects noted above, it is possible to prevent detachment of the cutting head held on the body from the body, even if the protrusions sandwiched between the inner peripheral walls should move in the axial direction.

REFERENCE SIGNS LIST

Figure 1:
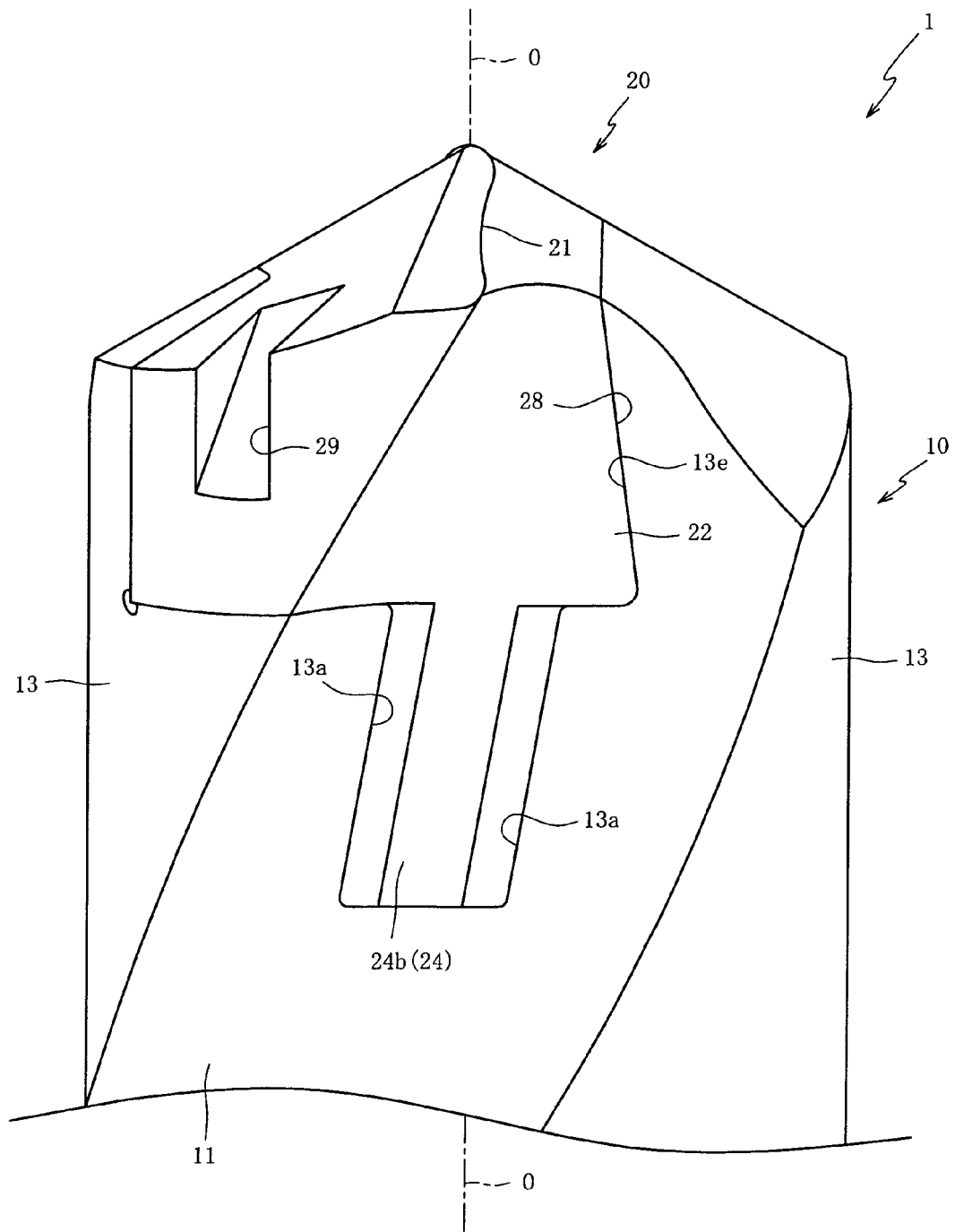
FIG. 1 is a side view of a throw-away rotating tool according to an embodiment of the present invention.

1 Throw-away rotating tool
10 Body
11 First groove (part of groove)
13 Erected portion
13a Inner peripheral wall
13a1 Ridge line
13b First surface
13e Second surface
20 Cutting head
22 Second groove (part of groove)
23 Projecting coupling portion
24 Outer peripheral wall
24a Protrusion
27 First receiving portion
28 Second receiving portion
O Axis

DESCRIPTION OF EMBODIMENTS

Hereinafter, an exemplary embodiment of the present invention will be described with reference to the accompanying drawings. FIG. 1 is a perspective view of a throw-away rotating tool 1 according to an embodiment of the present invention. It should be noted that in FIG. 1, illustration of the axial length of a body 10 is omitted.

First, referring to FIG. 1, a general configuration of the throw-away rotating tool 1 will be described. As shown in FIG. 1, the throw-away rotating tool 1 includes the body 10, and a cutting head 20 mounted to the body 10. The throw-away rotating tool 1 is a rotating tool to which the rotating force of a processing machine such as a machining center is transmitted via a holder (not shown) that holds the body 10, thereby performing cutting of a workpiece.

The body 10 serves to transmit the rotating force of the processing machine to the cutting head 20, and is made from high speed tool steel into a substantially shaft-like body. One end side of the body 10 is attached to the processing machine via the above-mentioned holder. In this embodiment, a first groove 11 formed at a predetermined twist angle is provided in the outer peripheral surface of the body 10 to discharge chips during cutting.

The cutting head 20 serves to cut a workpiece with cutting edges 21 provided at the distal end. The cutting head 20 is made from cemented carbide harder than the body 10, and is detachably mounted to the body 10. Thus, even when the cutting edges 21 reach their lifetime, cutting can be continued by replacing the cutting head 20 with another cutting head, without having to grind the cutting head 20 again. In this embodiment, the cutting head 20 also has second grooves 22 provided at the same twist angle as the first groove 11 to discharge chips during cutting, and surfaces of the second grooves 22 are flush with those of the first grooves 11 when the cutting head 20 is attached to the body 10. It should be noted that in this embodiment, the cutting head 20 has two cutting edges 21 and two second grooves 22.

Figure 2:
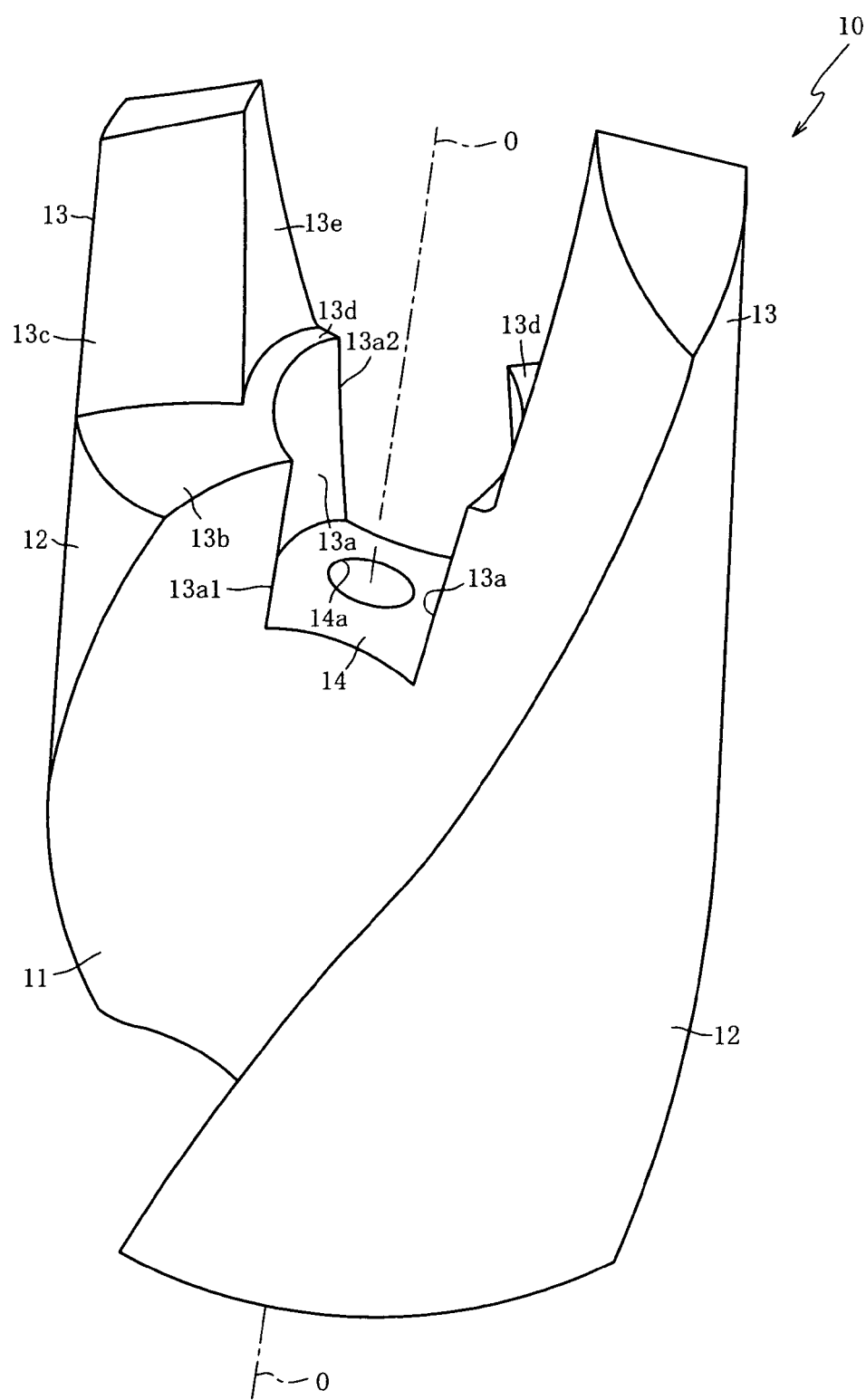
FIG. 2 is a perspective view of a body of the throw-away rotating tool.

Now, referring to FIG. 2, a detailed configuration of the body 10 will be described. FIG. 2 is a perspective view of the body 10 of the throw-away rotating tool 1. It should be noted that in FIG. 2, illustration of the length in the axial direction of the body 10 is omitted. The body 10 mainly includes plural (two in this embodiment) erected portions 13 each being extended from a land 12 as its outer peripheral surface and from a part of the first groove 11 as its side surface, and erected around an axis O in conformity with the twist angle of the first groove 11, and a bottom portion 14 provided on the rear end portion side of the erected portions 13. The erected portions 13 are portions for holding the cutting head 20, and are erected at a uniform angular pitch (180° in this embodiment) about the axis O. A projecting coupling portion 23 (described later) of the cutting head 20 is inserted in a space formed by the erected portions 13. Also, the bottom portion 14 is formed orthogonally to the axis O of the body 10, and has a hole 14a recessed at the central position aligned with the axis O. The hole 14a is a portion in which a projection 25a projected from a rear end portion 25 of the projecting coupling portion 23 (described later) of the cutting head 20 is fitted.

The erected portions 13 have inner peripheral walls 13a each formed as a set of arcuate curves of the same radius centered about the axis O. Since the inner peripheral walls 13a are formed so as to cut off a part of the first groove 11 in a cylindrical shape, the twist angle of ridge lines 13a1, 13a2 between the inner peripheral walls 13a and the first groove 11 is set to the same as the twist angle of the first groove 11. In this embodiment, the outside diameter of the body 10, the height of the inner peripheral walls 13a, the distance of the inner peripheral walls 13a from the axis O, and the twist angle of the ridge lines 13a1, 13a2 are set to 16 mm, approximately 8 mm, approximately 4 mm, and 15°, respectively.

Each of the erected portions 13 has a first surface 13b provided on the distal end side of the erected portions 13 and on the forward side of rotation of the body 10 at the time of cutting. The first surface 13b is formed as a surface substantially orthogonal to the axis O and is formed substantially parallel to the bottom portion 14. A torque transmission wall 13c forming a substantially perpendicular or acute angle to the first surface 13b is erected on the first surface 13b on the rearward side of rotation of the body 10 at the time of cutting. The width of the torque transmission wall 13c is formed slightly narrower than the width of the first surface 13b with respect to the direction of rotation of the body 10 at the time of cutting. A step surface 13d is a surface located on the same plane as the first surface 13b and formed in a stepped fashion from the upper end of the inner peripheral walls 13a formed in an arcuate shape toward the land 12 in the outer periphery.

A second surface 13e is a surface connected to the distal end side of the inner peripheral walls 13a via the step surface 13d. The second surface 13e crosses the torque transmission wall 13c via a ridge line, and is formed on the distal end side of each of the erected portions 13 in conformity with the twist angle of the first groove 11 as a set of arcuate curves whose radius from the axis O increases with increasing distance from the inner peripheral walls 13a toward the distal end side. The second surface 13e is formed so as to be inclined toward the axis O with increasing distance from the inner peripheral walls 13a toward the distal end side. In this embodiment, the inclination angle of the second surface 13e with respect to the axis is set to 10°.

Figure 3:
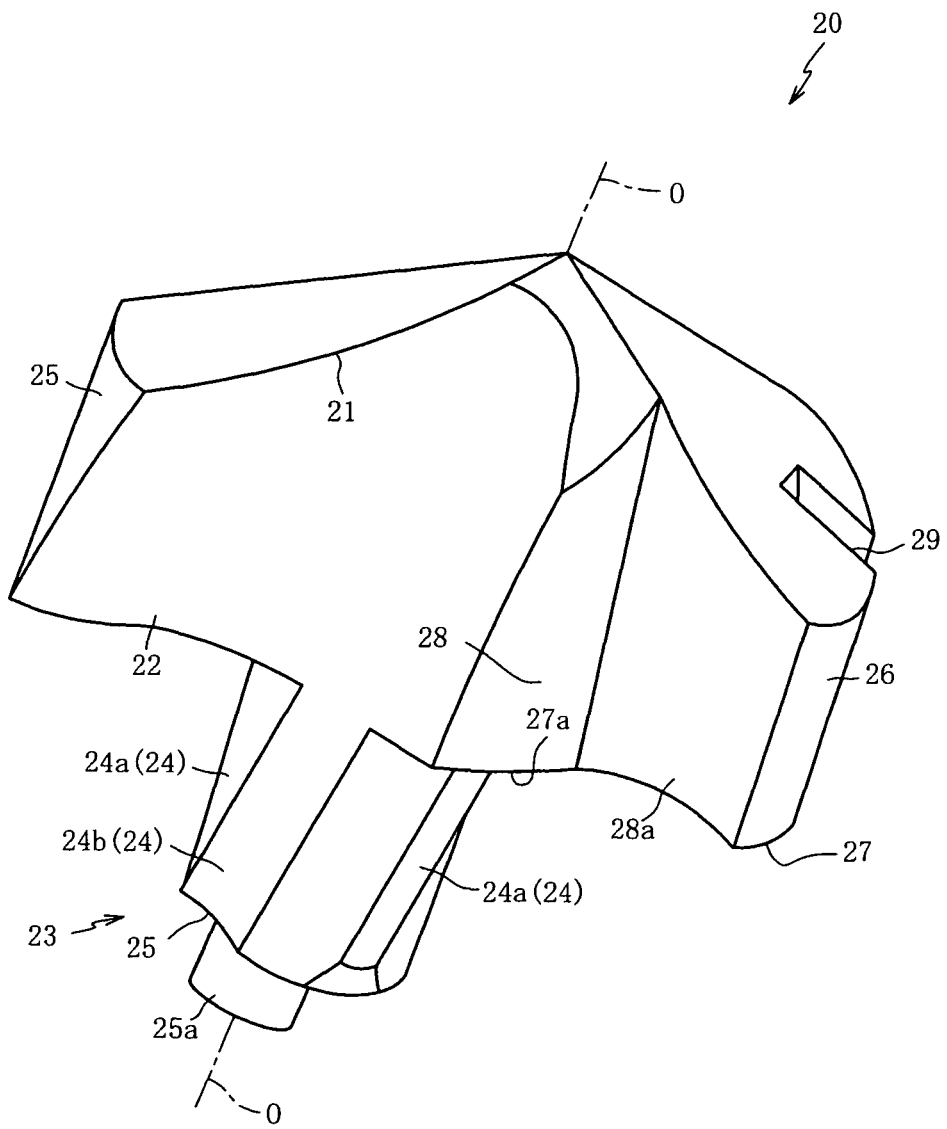
FIG. 3 is a perspective view of a cutting head of the throw-away rotating tool.

Next, referring to FIG. 3, a detailed configuration of the cutting head 20 will be described. FIG. 3 is a perspective view of the cutting head 20 of the throw-away rotating tool 1. As shown in FIG. 3, the cutting head 20 mainly includes the cutting edges 21 provided at the distal end, and the projecting coupling portion 23 having a shaft-like shape projected from the rear end (side opposite to the side where the cutting edges 21 are provided) coaxially with the axis O.

The projecting coupling portion 23 mainly includes an outer peripheral wall 24 formed in a substantially cylindrical shape, and a rear end portion 25 connected to the rear end side of the outer peripheral wall 24. The outer peripheral wall 24 includes plural protrusions 24a formed at a predetermined twist angle in a protruding fashion so as to extend along the entire length of the outer peripheral wall 24 from the distal end to the rear end portion 25, and an outer peripheral wall groove portion 24b formed between the protrusions 24a as a part of the second grooves 22. The distance at the top of the protrusions 24a from the axis O is set to substantially the same as the distance of the inner peripheral walls 13a of the body 10 (see FIG. 2) from the axis O. Thus, the protrusions 24a can be fitted in between the inner peripheral walls 13a of the body 10.

In this embodiment, the protrusions 24a are formed at a uniform angular pitch)(180° at two locations on the outer peripheral surface 24 of the projecting coupling portion 23. Thus, as the protrusions 24a are sandwiched between the inner peripheral walls 13a formed in the erected portions 13 of the body 10, the projecting coupling portion 23 is held between the erected portions 13. Also, the twist direction of the protrusions 24a is set to the same direction as the twist direction of the outer peripheral wall groove portion 24b and the second grooves 22, and the twist angle of the protrusions 24a is set to an angle larger than the twist angle of the outer peripheral wall groove portion 24b and the second grooves 22.

The projecting coupling portion 23 has the projection 25a projected from the center of the rear end portion 25. The projection 25a is inserted into the hole 14a recessed in the bottom portion 14 upon inserting the projecting coupling portion 23 inside the erected portions 13 of the body 10 (see FIG. 2) in a phase-shifted state. Thus, when attaching and detaching the cutting head 20 to and from the body 10, the body 10 and the cutting head 20 can be relatively rotated around the axis O about the hole 14a and the projection 25a. It should be noted that the protrusions 24a are chamfered at the top so that the protrusions 24a can smoothly slide on the inner peripheral walls 13a when relatively rotating the body 10 and the cutting head 20 around the axis O.

It should be noted that in this embodiment, the length of the projecting coupling portion 23 is set to substantially the same length as the height of the inner peripheral walls 13a of the body 10 (see FIG. 2). The length of the projecting coupling portion 23, the twist angle of the protrusions 24a, the distance at the top of the protrusions 24a from the axis O, the diameter of the projection 25a, and the length of the projection 25a are set to approximately 8 mm, 20°, approximately 4 mm, approximately 3 mm, and approximately 2 mm, respectively.

The cutting head 20 has a first receiving portion 27 provided on the distal end side (side opposite to the rear end portion 25) of the projecting coupling portion 23 and at a position shifted by the twist angle of the first groove 11 and the second grooves 22. The first receiving portion 27 is projected from the outer peripheral wall 24 in a direction orthogonal to the axis O and crosses a land 26.

The cutting head 20 also includes an extended portion 27a extended from the first receiving portion 27 on the same plane as the first receiving portion 27. The extended portion 27a is a portion that is projected from the projecting coupling portion 23 in a direction orthogonal to the axis O, and comes into contact with the step surface 13d of the body 10 (see FIG. 2). The first receiving portion 27 and the extended portion 27a are formed at predetermined positions on the cutting head 20 so as to be rotationally symmetrical about the axis O.

A second receiving portion 28 is a portion whose distance from the axis O is set larger than the distance from the axis O to the top of the protrusions 24a and smaller than the distance from the axis O to the land 26, and which crosses the extended portion 27a. The second receiving portion 28 is formed so as to be inclined toward the axis O with increasing proximity to the distal end of the cutting head 20, and is formed in a curved fashion at a position overlapping the second surface 13e of each of the erected portions 13 of the body 10 (see FIG. 2). It should be noted that in the second surface 13e of the body 10 which corresponds to the second receiving portion 28, the distance from the axis O to the second receiving portion 28 is set smaller than the distance from the axis O to each corresponding portion of the second surface 13e.

A transmission wall receiving portion 28a forming a substantially perpendicular angle or acute angle to the second receiving portion 28 is erected on the second receiving portion 28 on the forward side of rotation of the cutting head 20 at the time of cutting. The transmission wall receiving portion 28a is a portion that contacts the torque transmission wall 13c of the body 10 (see FIG. 2). It should be noted that in this embodiment, the inclination angle of the second receiving portion 28 with respect to the axis O is set to approximately 10°.

Figure 4:
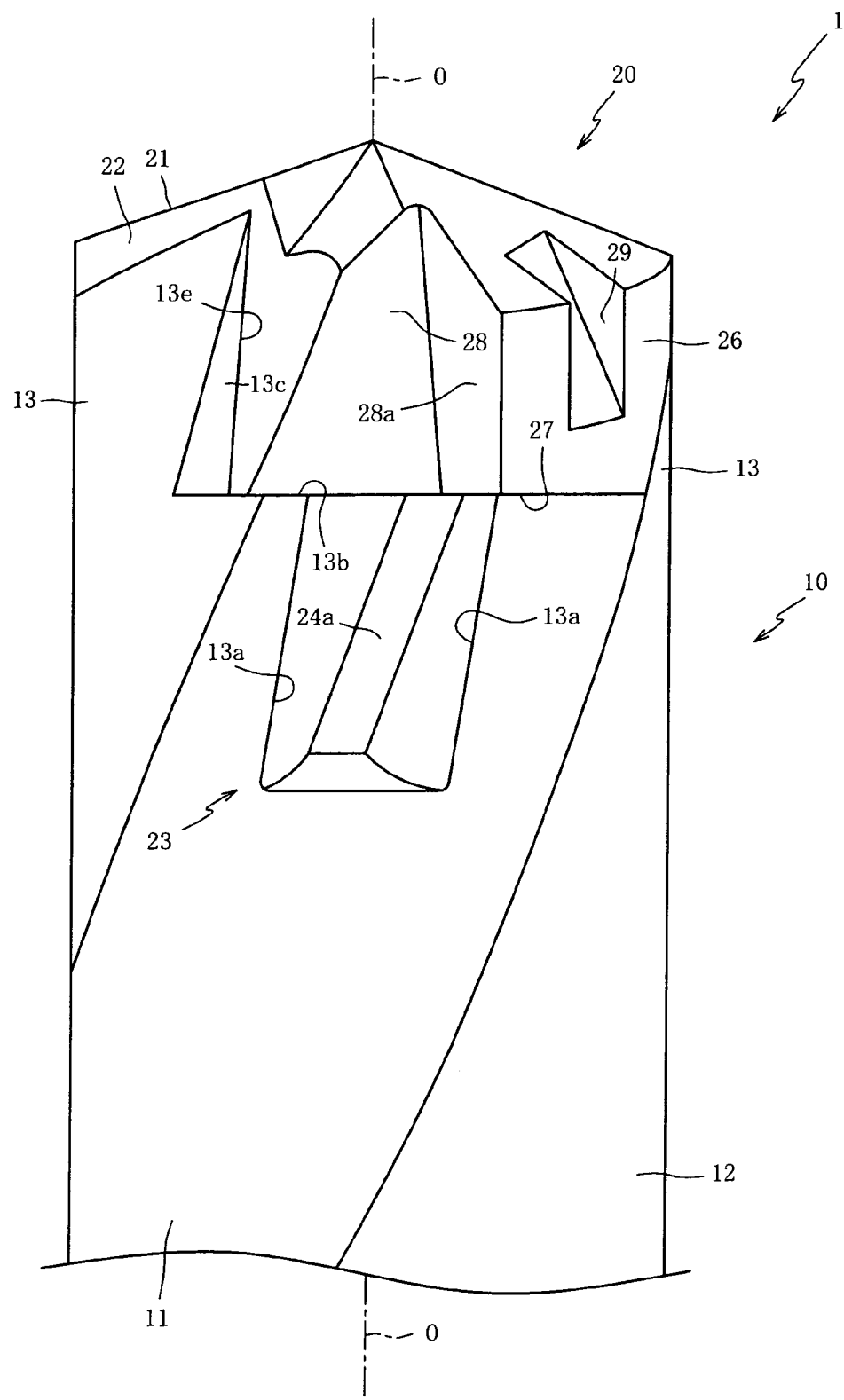
FIG. 4 is a side view of the throw-away rotating tool with the cutting head inserted in the body in a phase-shifted state.
Figure 5A:
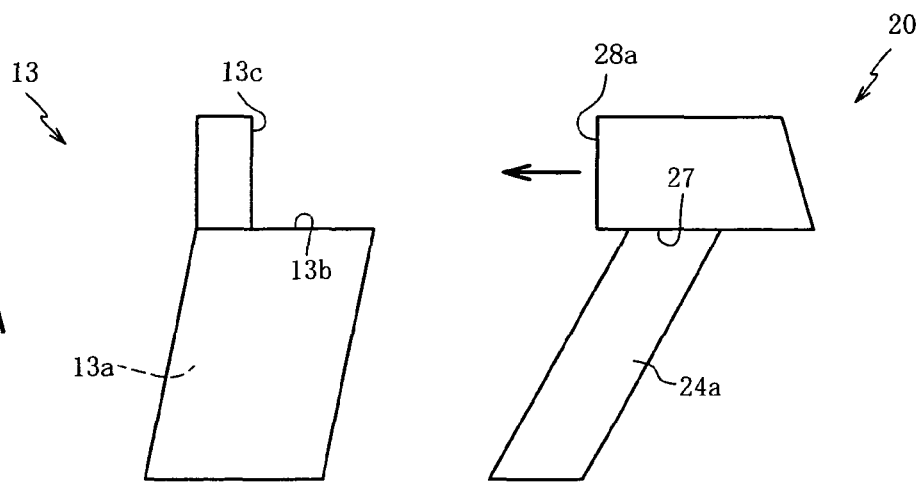
FIG. 5(a) is a schematic view schematically showing the cutting head and the body before the cutting head inserted in the body in a phase-shifted state is relatively rotated.
Figure 5B:
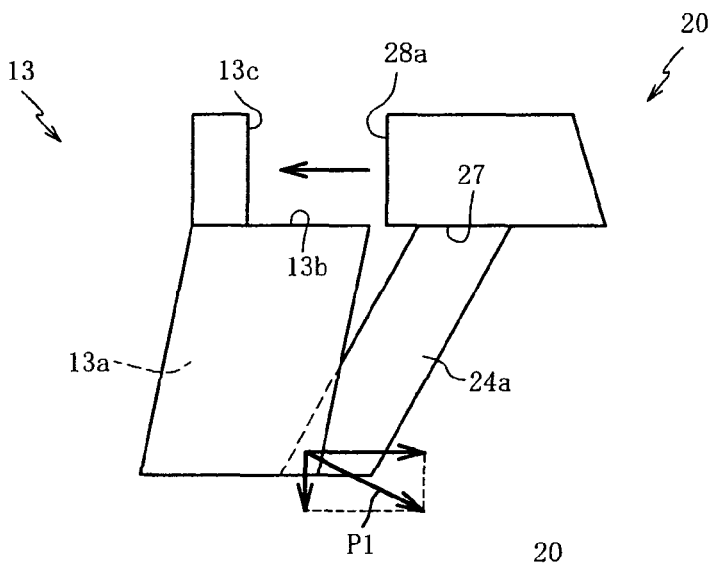
FIG. 5(b) is a schematic view schematically showing the cutting head and the body to be relatively rotated.
Figure 5C:
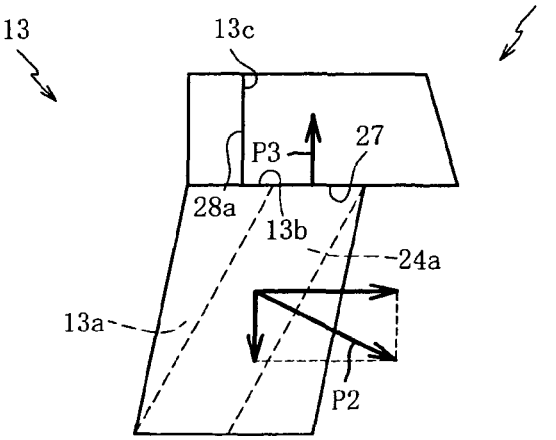
FIG. 5(c) is a schematic view schematically showing the cutting head and the body that have been relatively rotated.

Next, referring to FIG. 4 and FIG. 5, a description will be given of operation when attaching the cutting head 20 to the body 10. FIG. 4 is a side view of the throw-away rotating tool 1 with the cutting head 20 inserted in the body 10 in a phase-shifted state. FIG. 5(a) is a schematic view schematically showing the cutting head 20 and the body 10 before the cutting head 20 inserted in the body 10 in a phase-shifted state is relatively rotated. FIG. 5(b) is a schematic view schematically showing the cutting head 20 and the body 10 to be relatively rotated. FIG. 5(c) is a schematic view schematically showing the cutting head 20 and the body 10 that have been relatively rotated. It should be noted that the leftward arrows in FIGS. 5(a) and 5(b) indicate the direction of rotation of the cutting head 20, and the arrows P1, P2, P3 in FIGS. 5(b) and 5(c) each indicate the direction and magnitude of force exerted on the protrusions 24a or the first receiving portion 27.

When attaching the cutting head 20 to the body 10, as shown in FIG. 4, the projecting coupling portion 23 of the cutting head 20 is inserted in the space formed by the erected portions 13 in a phase-shifted state, and the projection 25a projected from the rear end portion 25 (see FIG. 3) of the projecting coupling portion 23 is fitted into the hole 14a recessed in the bottom portion 14 (see FIG. 2) of the body 10. While the second surface 13e is formed so as to be inclined to the axis O side, in a state with the cutting head 20 and the body 10 shifted in phase, the second grooves 22 of the cutting head 20 exist at the position of the second surface 13e, and the second grooves 22 are recessed to the axis O side. Thus, the projecting coupling portion 23 of the cutting head 20 can be inserted in the space formed by the erected portions 13 without being hindered by the second surface 13e. Next, an unillustrated replacement tool is inserted into an outer peripheral groove 29 formed at an edge of the distal end of the cutting head 20, the replacement tool is gripped, and the cutting head 20 and the body 10 are relatively rotated around the axis O until the transmission wall receiving portion 28a of the cutting head 20 abuts on the torque transmission wall 13c of the body 10.

As the cutting head 20 and the body 10 are relatively rotated, the state shown in FIG. 5(a) transitions to the state shown in FIG. 5(b), and the protrusions 24a come into contact with the inner peripheral walls 13a (the inner side in the plane of FIG. 5) from the rear end side. The protrusions 24a slide on the inner surfaces of the inner peripheral walls 13a while gradually increasing their contact area with the inner peripheral walls 13a, and pushed in between the inner peripheral walls 13a of the erected portions 13 (see FIG. 2). The erected portions 13 into which the protrusions 24a are pushed in tilt slightly to the outer peripheral side, and the protrusions 24a sandwiched between the inner peripheral walls 13a receive a reaction force P1 (see FIG. 5(b)) in an oblique direction on the rear end side orthogonal to the protrusions 24a. Due to the reaction force. P1 received by the protrusions 24a from the inner peripheral walls 13a, the protrusions 24a receive a force acting toward the rear end side (lower side in FIG. 5), causing the projecting coupling portion 23 (see FIG. 3) to be pulled to the rear end side of the erected portions 13. In this way, the projecting coupling portion 23 is stably held between the erected portions 13, and its misalignment with the axis O is regulated.

As described above, the projecting coupling portion 23 is held between the erected portions 13 through contact between the protrusions 24a formed as a part of the outer peripheral wall 24 (see FIG. 3) of the projecting coupling portion 23, and the inner peripheral walls 13a of the erected portions 13 (see FIG. 3). Thus, when preparing the projecting coupling portion 23, dimension control for portions other than the protrusions 24a can be mitigated. Also, it suffices that dimension control for the inner peripheral walls 13a of the erected portions 13 and the protrusions 24a be simply aimed at bringing the projecting coupling portion 23 into alignment with the axis O, and dimension control can be otherwise mitigated. Since the number of portions that require stringent dimension control and high machining accuracy can be reduced in this away, it is possible to improve productivity for the throw-away rotating tool 1.

Further, as the relative rotation is continued, the contact area between the protrusions 24a and the inner peripheral walls 13a gradually increases, and so does the force received by the protrusions 24a. As described above, the body 10 includes the first surface 13b formed as a surface located on the distal end side of the erected portions 13 in a direction orthogonal to the axial direction, and the cutting head 20 includes the first receiving portion 27 formed as a surface projected to the outer peripheral side from the projecting coupling portion 23 in a direction orthogonal to the axial direction. The first receiving portion 27 is formed at a position where the first receiving portion 27 overlaps and presses on the first surface 13b when the protrusions 24a are sandwiched between the inner peripheral walls 13a of the erected portions 13. Thus, as shown in FIG. 5(c), movement of the cutting head 20 with respect to the axial direction of the body 10 is regulated by means of the force (the downward arrow shown in FIG. 5(c))with which the projecting coupling portion 23 (see FIG. 3) is pulled to the rear end side of the erected portions 13 (see FIG. 2) due to the reaction force P2 received by the protrusions 24a from the inner peripheral walls 13a, and the reaction force P3 received by the first receiving portion 27 from the first surface 13b.

With regard to the positional relationship in the axial direction between the first receiving portion 27 and the first surface 13b, it is sufficient that the relationship be so set as to allow the first receiving portion 27 to press on the first surface 13b. Thus, the machining tolerance for the first receiving portion 27 and the first surface 13b can be set loose. Thus, movement of the cutting head 20 with respect to the axial direction can be regulated with a relatively loose machining tolerance, thereby enabling improved productivity for the throw-away rotating tool 1.

Further, the cutting head 20 (see FIG. 3) includes the second receiving portion 28 formed in the outer periphery on the distal end side of the cutting head 20, and the body 10 (see FIG. 2) includes the second surface 13e that is connected to the distal end side of the inner peripheral walls 13a and inclined toward the axis O. The second surface 13e is formed at a position that overlaps the second receiving portion 28 when the protrusions 24a are sandwiched between the inner peripheral walls 13a of the erected portions 13 (see FIG. 1). Thus, even when the protrusions 24a sandwiched between the inner peripheral walls 13a of the erected portions 13 move in the axial direction, the second receiving portion 28 of the cutting head 20 abuts on the second surface 13e of each of the erected portions 13, thereby restricting further movement in the axial direction. As a result, it is possible to prevent detachment of the cutting head 20 held on the body 10 from the body 10, even if the protrusions 24a sandwiched between the inner peripheral walls 13a should move in the axial direction.

In the body 10 (see FIG. 2), the ridge line 13a1, which is located on the side facing the direction of relative rotation between the first groove 11 and the inner peripheral walls 13a each formed as a set of arcuate curves of the same radius centered about the axis O, forms a part of the first groove 11 and is created along the first groove 11, the ridge line 13a1 is twisted in the same direction as the first groove 11. The twist angle of the ridge line 13a1 is the same as the twist angle of the first groove 11. On the other hand, the twist direction of the protrusions 24a (see FIG. 3) is set to the same direction as the twist direction of the ridge line 13a1 (see FIG. 2), and their twist angle is set to an angle larger than the twist angle of the ridge line 13a1. As a result, when the cutting head 20 and the body 10 are relatively rotated around the axis O, the protrusions 24a come into contact with the inner peripheral walls 13a from the rear end side, and the contact area between the protrusions 24a and the inner peripheral walls 13a gradually increases with the relative rotation, causing the protrusions 24a to be sandwiched between the inner peripheral walls 13a. Since the inner peripheral walls 13a can be manufactured by performing drilling in a cylindrical shape from the center of the distal end surface of the body 10 along the axis O so as to cut off a part of the first groove 11, the manufacture of the inner peripheral walls 13a is easy. In addition, since the twist angle of the protrusions 24a can be set with reference to the twist angle of the first groove 11 and the second grooves 22, the manufacture of the protrusions 24a is also easy. In this way, the manufacture of the inner peripheral walls 13a and the protrusions 24a can be facilitated, thereby making it possible to improve productivity for the throw-away rotating tool 1.

The present invention has been described above with reference to the embodiment. However, the present invention is by no means limited to the above embodiment, but it can be easily anticipated that various improvements and modifications are possible without departing from the scope of the present invention. For example, numerical values recited in the above embodiment (for example, the quantities and dimensions of individual components) are merely illustrative, and other numerical values can be adopted of course.

While the above embodiment is directed to the case in which the body 10 is made of high speed tool steel, and the cutting head 20 is made of a cemented carbide, the present invention is not limited to these. It is also possible to adopt other materials. As for such other materials, for example, the body 10 can be made of an alloy tool steel, and the cutting head 20 can be made of cermet, superfine particle cemented carbide, coated cemented carbide, or the like.

While the above embodiment is directed to the case of a twist drill with the first groove 11 and the second grooves 22 formed at a predetermined twist angle with respect to the axis O, the present invention is not necessarily limited to this, but can be applied to a straight drill in which the first groove 11 and the second grooves 22 are parallel to the axis O. Also, the present invention can be applied to a throw-away rotating tool with no grooves formed in the body 10.

While the above embodiment is directed to the case in which the distance between the inner peripheral walls 13a of the erected portions 13 and the axis O is constant across the height direction of the inner peripheral walls 13a, the present invention is not necessarily limited to this. It is also possible to set the distance so as to gradually increase along the height direction of the inner peripheral walls 13a, or gradually decrease along the height direction of the inner peripheral walls 13a. This is because in the throw-away rotating tool 1 according to the present invention, since the cutting head 20 is fixed to the body 10 by the protrusions 24a of the cutting head 20 coming into contact with the inner peripheral walls 13a of the body 10, as long as the protrusions 24a can be brought into contact with the inner peripheral walls 13a without backlash, the distances in the axial direction of the inner peripheral walls 13a and the projecting coupling portion 23 from the axis O do not affect the fixation of the cutting head 20.

While the above embodiment is directed to the case in which the inner peripheral walls 13a formed in the erected portions 13 of the body 10 are each a curved surface having no unevenness within the surface, the present invention is not necessarily limited to this. It is also possible to form each of the inner peripheral walls 13a as an uneven surface with a protruding shape capable of contacting each of the protrusions 24a formed in the projecting coupling portion 23. Even in the case in which the inner peripheral walls 13a are formed in a protruding shape, by setting the twist angle and twist direction of the protrusions 24a formed in the projecting coupling portion 23, following the relative rotation between the body 10 and the cutting head 20 when coupling the projecting coupling portion 23 and the erected portions 13 together, the protrusions 24a can be brought into contact with the inner peripheral walls 13a of the erected portions 13 from the rear end side so as to gradually increase their contact area. In this case as well, since a force (the arrows P1, P2 shown in FIG. 5) is exerted on the protrusions 24a from the inner peripheral walls 13a so as to pull the projecting coupling portion 23 to the rear end side, the same operation as that of the above embodiment can be obtained.

While the above embodiment is directed to the case in which the step surface 13d is formed in the body 10 and the extended portion 27a is formed in the cutting head 20, the present invention is not necessarily limited to this. It is also possible not to provide the step surface 13d and the extended portion 27a. In this case as well, the rotating force of a processing machine such as a machining center can be transmitted to the cutting head 20 via the body 10 by means of contact between the torque transmission wall 13c of the body 10 and the transmission wall receiving portion 28a of the cutting head 20. In addition, the cutting head 20 can be firmly fixed to the body 10 by means of contact between the first surface 13b of the body 10 and the first receiving portion 27 of the cutting head 20.

While the above embodiment is directed to the throw-away rotating tool 1 having the cutting edges 21 formed at two locations at the distal end of the cutting head 20, the present invention is not necessarily limited to this. It is also possible to use the cutting head 20 having cutting edges formed at three or more locations, and the body 10. Also, the number of the erected portions 13 of the body 10 can be set to three or more as appropriate in accordance with the cutting head 20.

While the above embodiment is directed to the case in which the protrusions 24a are formed at two locations on the projecting coupling portion 23 at a pitch of 180°, the present invention is not necessarily limited to this. It is of course possible to form the protrusions 24a at three or more locations. This is because since the throw-away rotating tool 1 according to the above embodiment is configured such that the protrusions 24a come into contact with the inner peripheral walls 13a of the erected portions 13 to thereby couple the projecting coupling portion 23 and the erected portions 13 together, the number of the protrusions 24a can be set in an arbitrary fashion.

While the above embodiment is directed to the case in which the protrusions 24a are formed across the entire length of the projecting coupling portion 23 from the distal end to the rear end portion 25, the present invention is not necessarily limited to this. It is also possible to form the protrusions 24a across a part of the length from the distal end to the rear end portion 25 of the projecting coupling portion 23. This is because since the throw-away rotating tool 1 according to the above embodiment is configured such that the protrusions 24a come into contact with the inner peripheral walls 13a of the erected portions 13 to thereby couple the projecting coupling portion 23 and the erected portions 13 together, an arbitrary length can be set as long as the contact area between the protrusions 24a and the inner peripheral walls 13a can be secured.

While the above embodiment is directed to the case in which the hole 14a is formed in the bottom portion 14 of the body 10, and the projection 25a to be fitted in the hole 14a is formed in the cutting head 20, the present invention is not necessarily limited to this. In some cases, the hole 14a and the projection 25a are not provided. This is because even when the hole 14a and the projection 25a are not provided, the projecting coupling portion 23 of the cutting head 20 can be inserted inside the erected portions 13 of the body 10 to relatively rotate the body 10 and the cutting head 20 about the axis O.

The invention claimed is:

1. A throw-away rotating tool comprising: a body having a plurality of erected portions erected around an axis at an interval from each other; and a cutting head made from a material harder than the body and having a projecting coupling portion projected from a rear end, the projecting coupling portion being inserted in a space formed by the erected portions and relatively rotated around the axis to couple the projecting coupling portion and the erected portions together,
wherein the throw-away rotating tool includes a plurality of protrusions formed in a protruding shape at a predetermined twist angle as a part of an outer peripheral wall of the projecting coupling portion and sandwiched between inner peripheral walls of the erected portions, and
the twist angle and a twist direction of the plurality of protrusions are set in such a way that with relative rotation of the body and the cutting head when coupling the projecting coupling portion and the erected portions together, the plurality of protrusions come into contact with the inner peripheral walls of the erected portions from a rear end side and their contact area gradually increases;
wherein the inner peripheral walls are each formed as a set of arcuate curves of the same radius centered about the axis; and
the twist direction of the plurality of protrusions is set to the same direction as a twist direction of a ridge line on a side facing a direction of relative rotation between a groove recessed in an outer periphery of the body and the inner peripheral walls, and the twist angle of the plurality of protrusions is set to an angle larger than a twist angle of the ridge line.

2. The throw-away rotating tool according to claim 1, comprising:
a first surface formed as a surface located on a distal end side of the erected portions in a direction orthogonal to an axial direction; and
a first receiving portion formed as a surface projected to an outer peripheral side from the projecting coupling portion in a direction orthogonal to the axial direction,
wherein the first receiving portion is formed at a position where the first receiving portion overlaps the first surface and presses on the first surface when the protrusions are sandwiched between the inner peripheral walls of the erected portions by relatively rotating the body and the cutting head about the axis.

3. The throw-away rotating tool according to claim 2, comprising:
a second receiving portion formed in an outer periphery on a distal end side of the cutting head; and
a second surface connected to a distal end side of the inner peripheral walls and inclined toward the axis,
wherein the second surface is formed at a position that overlaps the second receiving portion when the protrusions are sandwiched between the inner peripheral walls of the erected portions by relatively rotating the body and the cutting head about the axis.

4. The throw-away rotating tool according to claim 1, comprising:
a second receiving portion formed in an outer periphery on a distal end side of the cutting head; and
a second surface connected to a distal end side of the inner peripheral walls and inclined toward the axis,
wherein the second surface is formed at a position that overlaps the second receiving portion when the protrusions are sandwiched between the inner peripheral walls of the erected portions by relatively rotating the body and the cutting head about the axis.

5. The throw-away rotating tool according to claim 1, comprising:
a first surface formed as a surface located on a distal end side of the erected portions and crossing an axial direction; and
a first receiving portion formed as a surface projected to an outer peripheral side from the projecting coupling portion and crossing the axial direction,
wherein the first receiving portion is formed at a position where the first receiving portion overlaps the first surface and presses on the first surface when the protrusions are sandwiched between the inner peripheral walls of the erected portions by relatively rotating the body and the cutting head about the axis.

6. The throw-away rotating tool according to claim 5, comprising:
a second receiving portion formed in an outer periphery on a distal end side of the cutting head; and
a second surface connected to a distal end side of the inner peripheral walls and inclined toward the axis,
wherein the second surface is formed at a position that overlaps the second receiving portion when the protrusions are sandwiched between the inner peripheral walls of the erected portions by relatively rotating the body and the cutting head about the axis.

* * * * *